May 17, 1932.  N. B. OBBARD  1,859,152
TOWER
Filed March 18, 1931  2 Sheets-Sheet 1

Inventor:
NORMAN B. OBBARD,
by: Meins & Rauber
his Attorneys

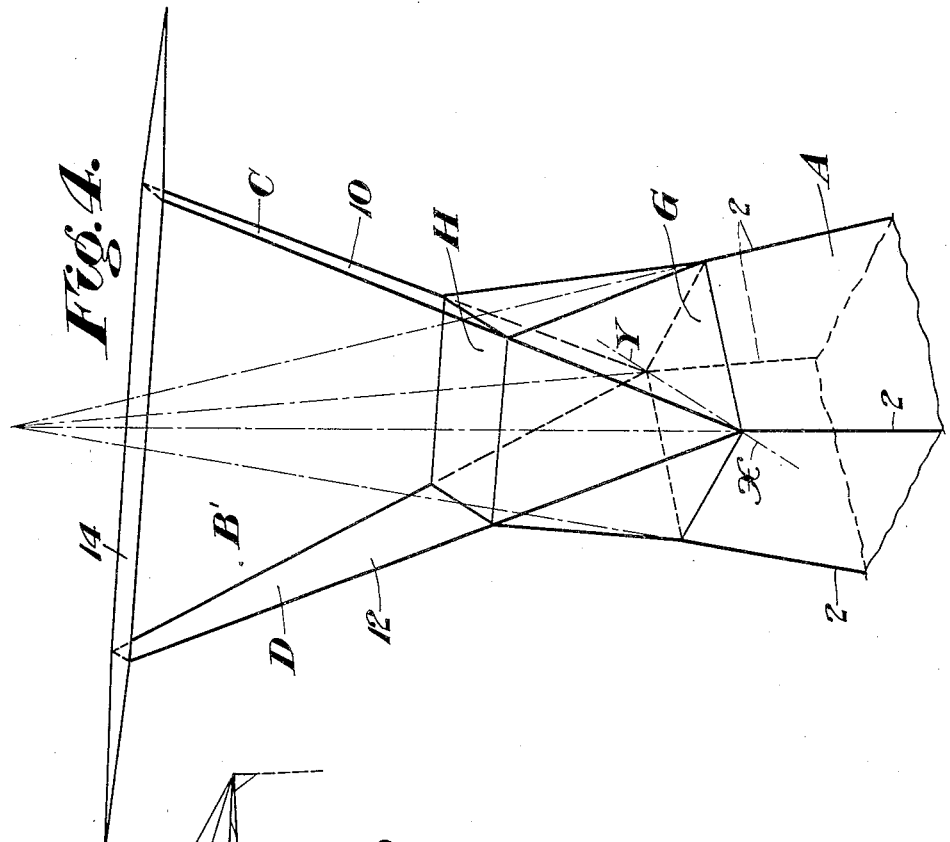
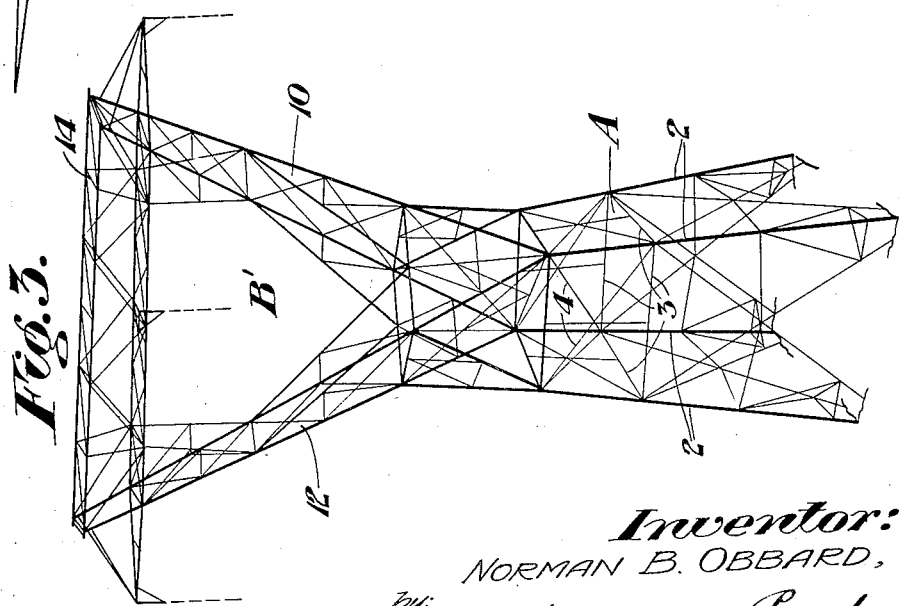

Patented May 17, 1932

1,859,152

UNITED STATES PATENT OFFICE

NORMAN B. OBBARD, OF SEWICKLEY, PENNSYLVANIA

TOWER

Application filed March 18, 1931. Serial No. 523,601.

This invention relates to towers and, while not limited thereto, relates more particularly to towers for carrying high tension lines and has for its object the provision of a novel form of tower, the lower portion of which will resist overturning to the maximum degree and the upper portion of which will resist shear to the maximum degree.

Towers are ordinarily constructed and set with two sides parallel to the line so as to resist shearing forces but such construction is not good for resisting overturning forces, since the load is carried chiefly by two diagonally opposite legs.

In the drawings:

Figure 3 is a perspective view of a modified form of tower.

Figure 4 is a diagrammatic view of the tower of Figure 3 illustrating the distribution of loads.

Referring more particularly to the drawings, the letter A designates the main body portion of the tower and the letter B designates the line carrying or head portion.

The body portion A of the tower is preferably in the form of a frustum of a pyramid of square cross-section and is composed of four legs 2 connected by the usual horizontal and diagonal lacing 3 and 4, respectively.

Figure 1:
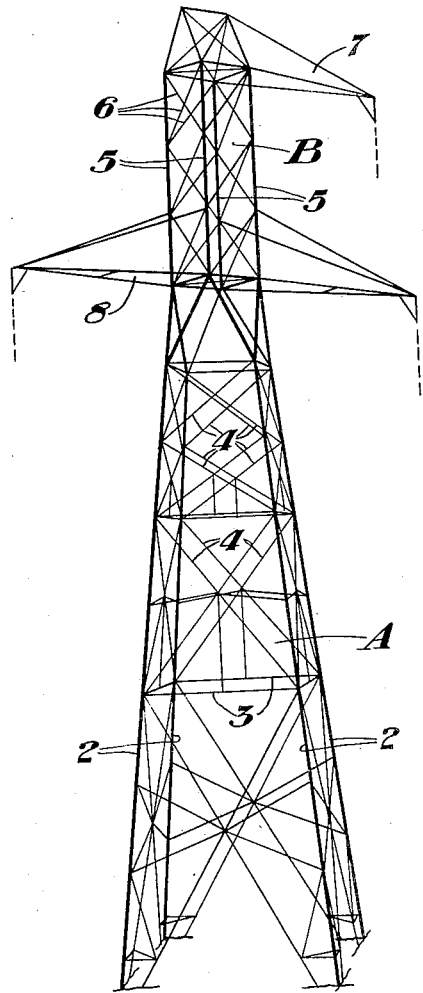
Figure 1 is a perspective view of a tower constructed in accordance with this invention.
Figure 2:
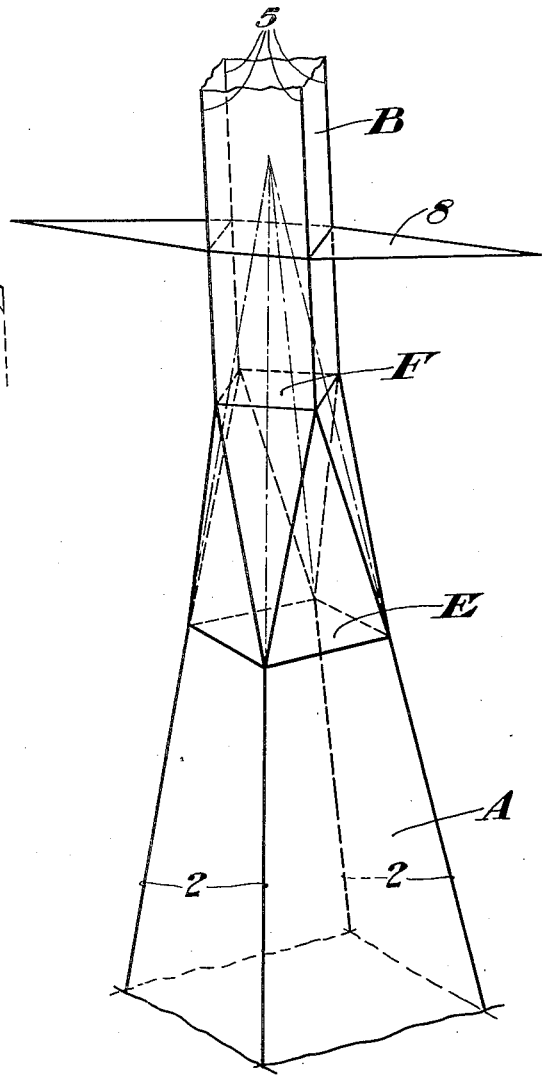
Figure 2 is a diagrammatic view of the tower of Figure 1 illustrating the distribution of loads in the tower parts.

The upper or head portion B of the tower of Figures 1 and 2 is preferably in the form of a prism of rectangular or square cross-section and has four legs 5 connected by diagonal bracing 6.

The upper or head portion B of the tower is turned 45 degrees relative to the lower or body portion, as will be clearly seen by reference to the planes of intersections E and F of Figure 2, and the body portion is set with its sides and the axes of the rectangle at an angle of 45 degrees to the line so that the upper or head portion has two sides parallel with the line.

By setting the tower with the sides of its body portion on an angle to the line the maximum resistance to overturning is obtained since the load is distributed over all four legs 2 of the tower body.

The head portion B of Figures 1 and 2 may be provided with any suitable form of line-supporting arms, arms 7 and 8 being shown.

When it is desired to carry three or more conductors in a substantially horizontal plane, it is important to properly distribute at the ends of the cross-arms the loads caused by a broken cable. Therefore a novel form of head B such as shown in Figures 3 and 4 is preferably used.

The main body portion A of the tower of Figures 3 and 4 is of substantially the same construction as that of Figures 1 and 2 but the upper portion or head B' is of wedge shape and of rectangular cross-section with two sides of the rectangle lying parallel to the line and at an angle of 45 degrees to the sides of the body portion so that the apex or line X—Y of the wedge is lying on one diagonal of the rectangular plan of the body portion.

The wedge-shaped head is composed of two upwardly tapering, outwardly diverging skeleton arms 10 and 12 joined at their upper ends by a cross-arm 14 to which the transmission lines are connected.

The parallel planes of intersections G and H of this tower (see Figure 4) show the rectangular cross-sections of the body A and head B', respectively, which are at an angle of 45 degrees with each other. The apex or point line of the wedge is the line X—Y which lies upon a diagonal of the plane G of the body portion A. Torsional loads on the cross-arm 14 are brought down through suitable bracing or lacing in the planes C and D of the arms 10 and 12, respectively, to the line X—Y from where they are distributed over the plane G and down the sides of the tower body A.

While I have shown and described certain specific embodiments of my invention it will be understood that I do not wish to be limited thereto, since various modifications may be made without departing from the scope thereof, as defined in the appended claims.

I claim:

1. The combination with a transmission line of a tower, the lower part of which is of rectangular cross-section with its sides at an angle to the line, and the upper part of which is of rectangular cross-section with two sides parallel to the line.

2. The combination with a transmission line of a tower comprising a main body portion of rectangular cross-section with its sides at substantially equal angles to the line, and an upper line carrying portion also of rectangular cross-section with two of its sides parallel to the line.

3. The combination with a transmission line of a tower comprising a main body portion of rectangular cross-section with its sides at an angle of substantially 45 degrees to the line, and an upper line carrying portion also of rectangular cross-section with two of its sides parallel to the line.

4. The combination with a transmission line of a tower comprising a main body portion in the form of a frustum of a pyramid of rectangular cross-section with its sides at an angle of substantially 45 degrees with the line, and an upper line carrying portion of rectangular cross-section with two of its sides parallel to the line.

5. The combination with a transmission line of a tower comprising a main body portion in the form of a frustum of a pyramid of rectangular cross section with its sides at an angle of substantially 45 degrees with the line, and an upper line carrying portion in the form of a wedge of rectangular cross-section with two of its sides parallel to the line, and with the line of intersection of the said two sides of the wedge lying on a diagonal of the cross-section of the pyramid, the sides of said wedge-shaped portion being braced to deliver the loads from said wedge-shaped portion to said diagonal line for distribution throughout the main body portion of the tower.

6. The combination with a transmission line of a tower comprising a main body portion of rectangular cross-section with its sides at an angle of substantially 45 degrees with the line, and an upper line carrying portion of rectangular cross-section with two of its sides parallel to the line.

7. The combination with a transmission line of a tower comprising a main body portion in the form of a frustum of a pyramid of rectangular cross-section with its sides at an angle of substantially 45 degrees with the line, and an upper line carrying portion in the form of a wedge of rectangular cross-section with two of its sides parallel to the line, and with the line of intersection of the said two sides of the wedge lying on a diagonal of the cross-section of the pyramid, the sides of said wedge-shaped portion being braced to deliver the loads from said wedge-shaped portion to said diagonal line for distribution throughout the main body portion of the tower.

8. A tower comprising a main body portion of rectangular cross-section, and an upper line carrying head portion of rectangular cross-section, said body portion and said head portion being arranged so that the planes of the side faces of said head portion are at an angle of 45 degrees to the planes of the side faces of said body portion.

In testimony whereof, I have hereunto set my hand.

NORMAN B. OBBARD.